United States Patent [19]
Aske

[11] 3,845,755
[45] Nov. 5, 1974

[54] T-MANIFOLD ASSEMBLY FOR GAS HEATED TOOL

[76] Inventor: Leonard E. Aske, 5508 Park Ave., Minneapolis, Minn. 55417

[22] Filed: Dec. 7, 1972

[21] Appl. No.: 312,824

[52] U.S. Cl.................. 126/401, 126/226, 432/225
[51] Int. Cl............................................... F24j 3/00
[58] Field of Search .......... 126/401, 405, 406, 226, 126/231, 233; 432/225, 226, 227

[56] References Cited
UNITED STATES PATENTS

| 729,346 | 5/1903 | Huff.................................... 126/233 |
| 3,053,311 | 9/1962 | Nottage ............................. 126/401 |
| 3,079,980 | 3/1963 | Mihm.................................. 126/401 |

FOREIGN PATENTS OR APPLICATIONS

| 588,988 | 6/1947 | Great Britain...................... 126/401 |

Primary Examiner—John J. Camby

[57] ABSTRACT

A gas heated paint scraper including a removeable T-manifold assembly mounted adjacent an adjustable paint scraper knife for providing a relatively flat flame of essentially the same width as the scraper knife. The flame is regulatable over a relatively wide temperature range by combustion control means for controlling the gas-air mixture at the manifold assembly. A heat shield is provided to prevent the flame from overly heating the scraper and knife handle during operation of the apparatus. Finally, a rotary blade can be inserted in place of the scraper knife and, with the T-manifold removed, the flame is directed toward the rotary blade for facilitating its use in cutting tile, felt, etc.

2 Claims, 10 Drawing Figures

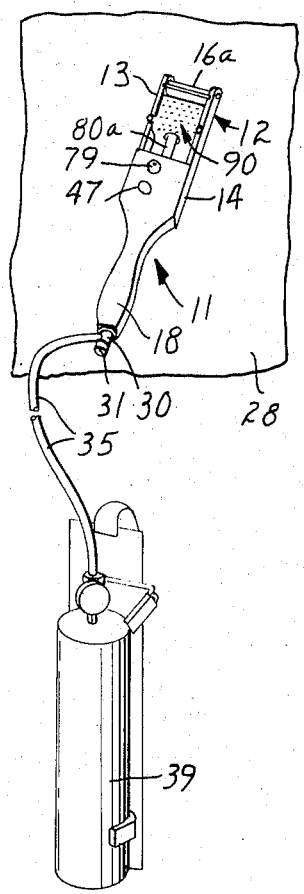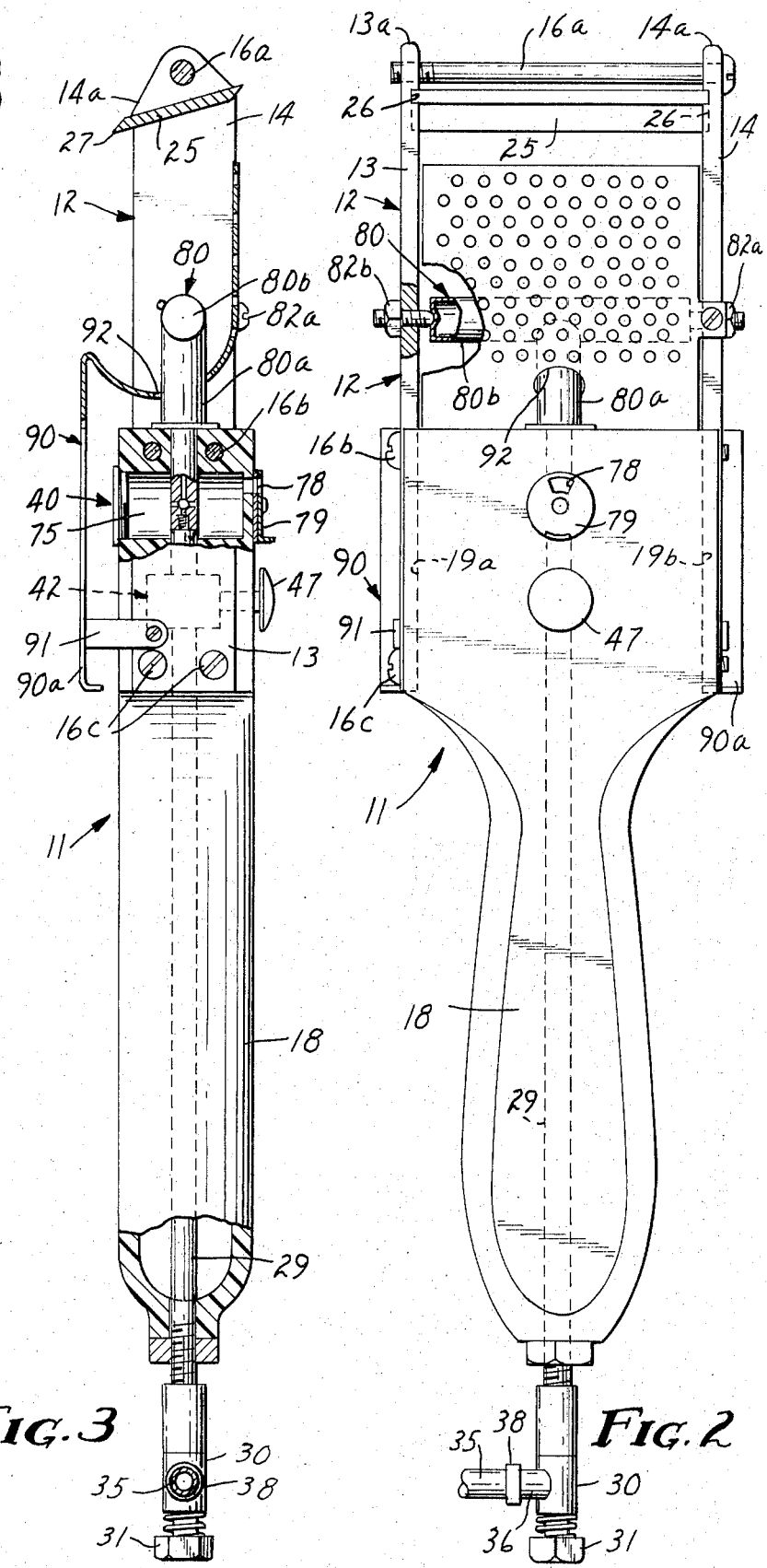

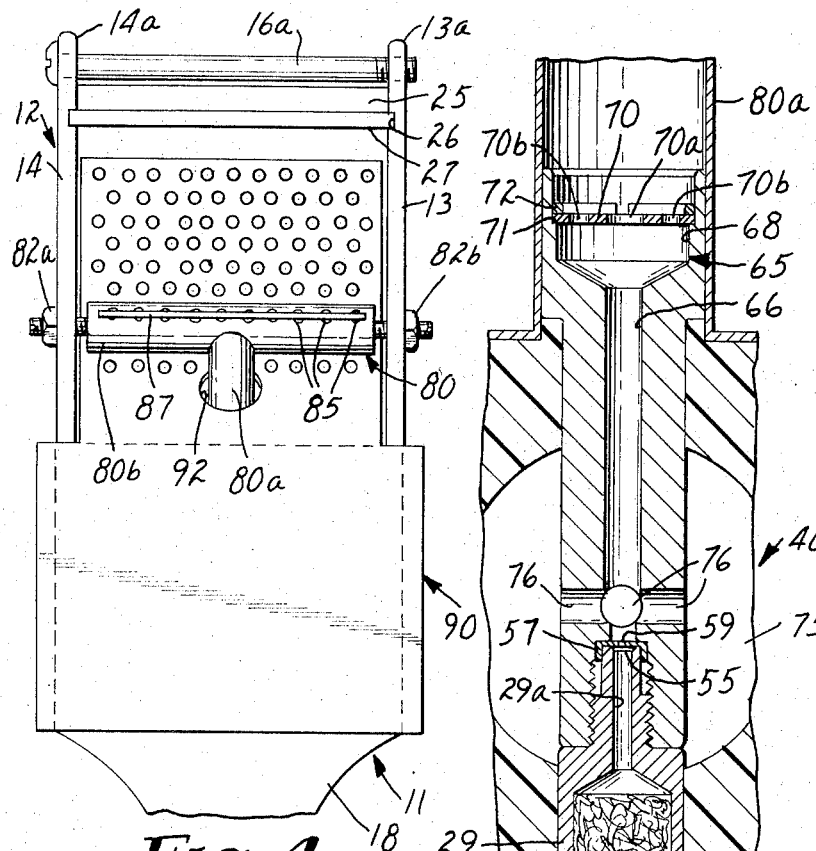
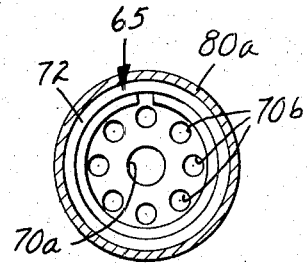
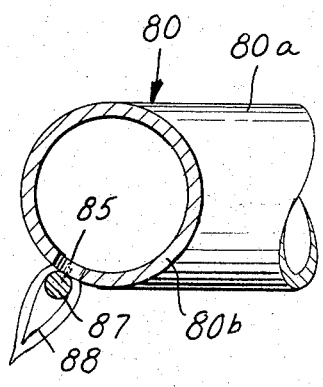
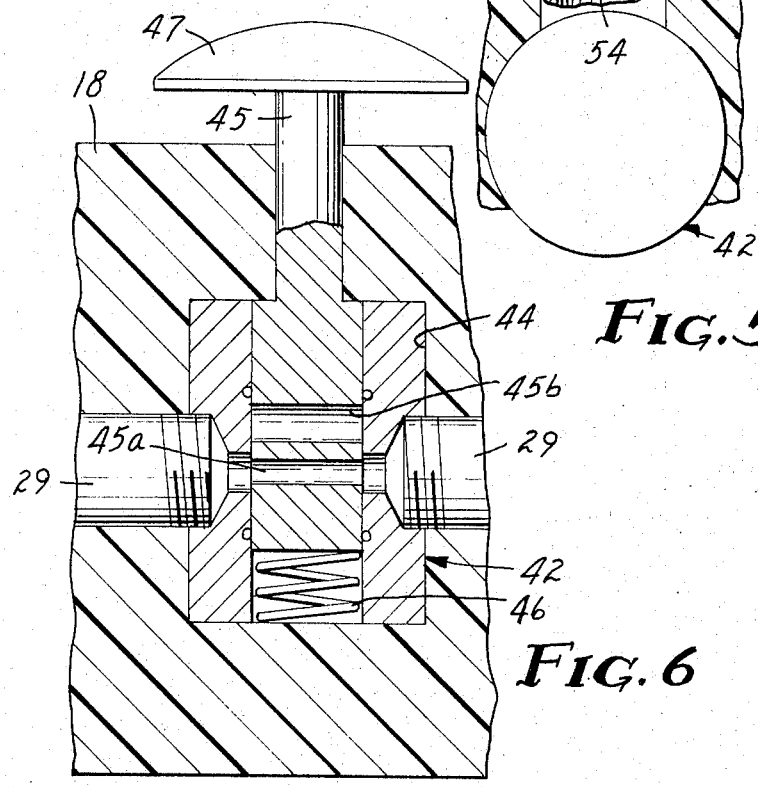
FIG. 4
FIG. 5
FIG. 6
FIG. 7
FIG. 8

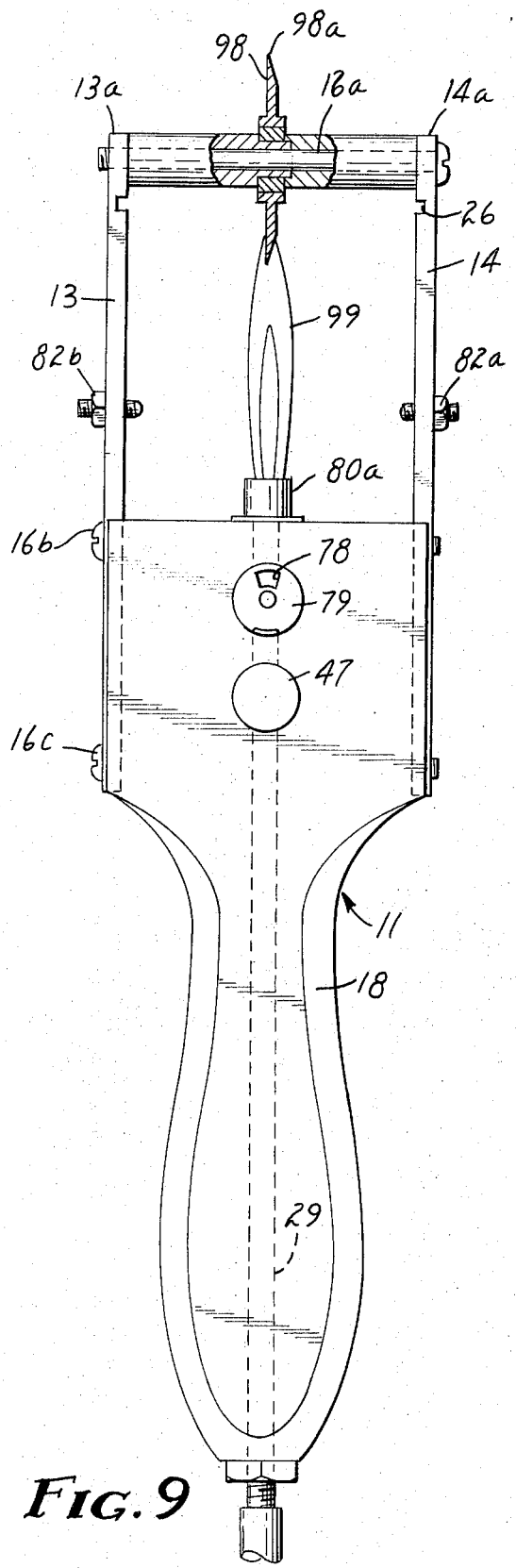
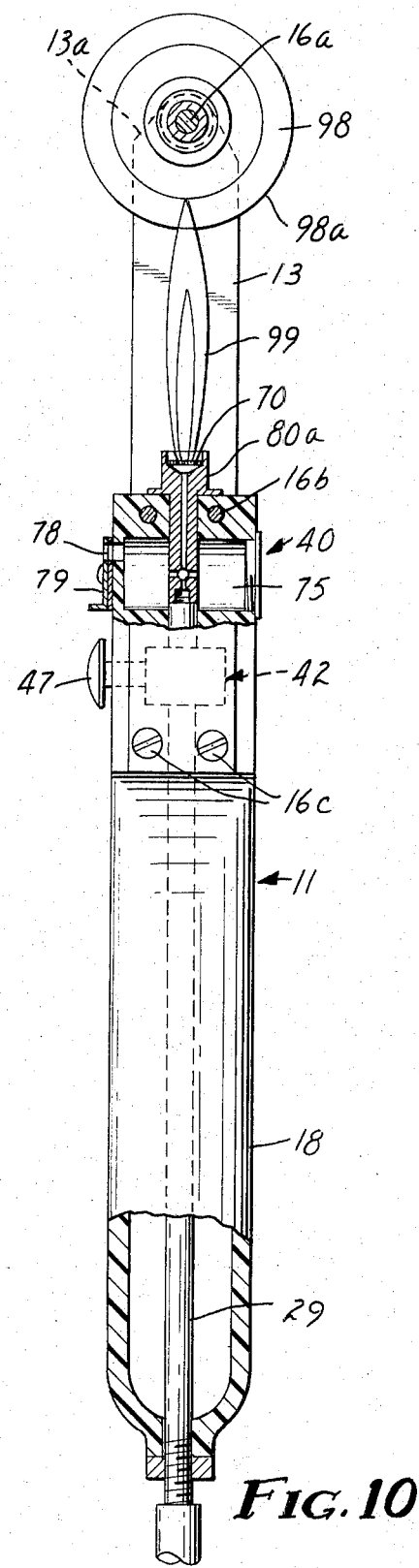
FIG. 9
FIG. 10

T-MANIFOLD ASSEMBLY FOR GAS HEATED TOOL

BACKGROUND OF THE INVENTION

1. Field of the Invention

The present invention pertains to flame producing apparatus, and particularly to apparatus for producing a flame which finds a highly desirable application in conjunction with material scraper means to facilitate removal of various materials from a surface.

2. Background of the Prior Art

The commercially available flame producing devices (e.g., the conventional blow torch) produce a relatively long and narrow flame. While such flame producing devices are occasionally utilized to facilitate the removal of various different types of materials (e.g., paint, varnish, glazing compound, etc.,) by causing the heated material to blister or crack, the shape (i.e., narrowness) of the flame has significantly reduced the utilization of these devices, particularly for large work areas. Further, the flame provided by these devices is typically of such great length as not to allow a conventional scraper knife to be attached to the device for simultaneously heating and scraping a material. Rather, utilization of the presently available apparatus necessitates two separate operations: (1) exposure of the material (e.g., paint) to the flame produced by the burner apparatus, and (2) then subsequent removal of the blistered and cracked paint utilizing a separate scraping device.

As can be readily appreciated, apparatus for providing a relatively flat flame which can be utilized in conjunction with a material scraping device is commercially highly desirable. Such a device would greatly facilitate removal of a material from a surface without the disadvantages presently encountered in utilizing the commercially available devices.

SUMMARY OF THE INVENTION

The present invention provides apparatus for producing a flame useable in conjunction with material cutting means. In particular, this apparatus finds a highly desirable application in conjunction with apparatus for scraping a material adhering to a surface. To accomplish this, a scraper is removeably attached to a mounting frame so as to have a cutting edge project outwardly therefrom. A combustion manifold connectable to a source of a combustible gas is likewise attached to the mounting frame for directing the gas flame outwardly from the mounting frame generally adjacent the scraper and preferably in a direction parallel to the cutting edge of the scraper. To allow regulation of the flame, combustion control means are provided for controlling the gas-air mixture. In the preferred embodiment, the manifold means is a readily removeable T-manifold having a plurality of flame outlet holes therein. A dual flame combustion bar is positioned adjacent the flame outlet holes so as to cause the flame to separate and roll around the combustion bar thereby retaining the combustion close to the T-manifold resulting in a relatively wide, short flame. Further, the combustion control means includes an air damper assembly for continuously regulating the flame temperature over a relatively wide range and an additional valving assembly for momentarily controlling the length of the flame. Finally, with the T-manifold removed and a rotary blade mounted in place of the scraper knife, an elongated flame is obtained which is directed toward the blade for heating its circular cutting edge so as to facilitate the use thereof in cutting tile, felt, etc.

The apparatus described summarily above has been found to be highly reliable, yet inexpensive to manufacture. The wide, flat flame provided by the T-manifold assembly allows the operator to simultaneously heat and scrape a considerable surface area on each pass. Similarly, the elongated flame provided by the apparatus with the manifold assembly removed greatly increases the efficiency of a rotary blade in cutting tile, rubber, felt and the like. Other features of the invention, such as the readily adjustable flame temperature, render my invention further advantageous. These additionally desirable features will become readily apparent from a reading of the detailed description which follows.

BRIEF DESCRIPTION OF THE DRAWINGS

Referring now to the drawings wherein like numerals represent like elements of the invention throughout the various Figures:

FIG. 1 is a perspective view of the gas heated paint scraper and remotely positioned tank for containing a combustible gas as provided by the present invention;

FIG. 2 is a top elevational view of the present paint scraper;

FIG. 3 is an axial cross-section of the gas heated paint scraper shown in FIG. 2;

FIG. 4 is a fragmented, bottom view of my gas heated paint scraper;

FIG. 5 is an enlarged axial cross-section showing a portion of the combustion control means provided by my invention;

FIG. 6 is an enlarged, fragmented cross-section illustrating the valving assembly for momentarily increasing the length of the flame;

FIG. 7 is a front elevational view of the gas diffuser disk utilized in my invention;

FIG. 8 is an enlarged, transverse cross-section of the T-manifold assembly showing the flat, dual flame provided thereby;

FIG. 9 is a fragmented, top elevational view of another embodiment of the present invention including a rotary blade inserted in place of the scraper knife utilized in the embodiment shown in FIGS. 1–8; and FIG. 10 is a fragmented, axial cross-section of the embodiment shown in FIG. 9.

DESCRIPTION OF THE PREFERRED EMBODIMENT

In the drawings, the numeral 11 generally designates the preferred gas heated cutting means provided by the present invention. In the embodiment shown in FIGS. 1–8, the apparatus 11 takes the form of a gas heated, material scraper for scraping material adhering to a surface. Although numerous different materials and surfaces can be scraped utilizing this gas heated scraper, the apparatus finds a highly desirable application in scraping paint, varnish, and the like. Furthermore, as will be described subsequently and as shown in FIGS. 9 and 10, the gas heated cutting means 11 can be readily adapted to provide a gas heated, rotary blade for cutting tile, rubber, asphalt, and the like.

The gas heated scraper 11 shown in FIGS. 1–8 includes a mounting frame 12 comprising two elongated, planar members 13 and 14 held in a spaced, parallel relationship by screws 16a, 16b and 16c extending transversely there between. Each of the outward end portions of members 13 and 14 define a guide surface 13a and 14a, respectively, for use in the cutting operation. The mounting frame 12 includes a handle portion or member 18 formed from a suitable plastic material (e.g., "Zytel" manufactured by E. I. duPont de Nemours and Co.). A pair of longitudinally extending slots 19a and 19b are molded within handle 18 for receiving an inner end portion of each of the planar frame members 13 and 14, respectively. The screws 16b and 16c each extend through a transversely extending opening (not numbered) within handle 18 so as to secure the frame members to the handle in a readily removable fashion.

Cutting means in the form of a planar scraper blade 25 is mounted transversely between frame members 13 and 14 adjacent the outer end portion thereof (i.e., the end portion opposite handle 18). The opposite ends of blade 25 are positioned within an angularly milled slot 26 in each of the framing members 13 and 14 and firmly held therein by tightening of screw 16a. The blade 25 includes a sharpened cutting or scraping edge 27 which projects angularly outward from the frame members 13 and 14 for use in scraping paint (or other similar materials) adhering to a surface such as the surface 28 shown in FIG. 1. The position of scraping edge 27 relative to the guide surfaces 13a and 14a can be readily adjusted by loosening transverse screw 16a so as to allow movement of blade 25 within the slots in frame members 13 and 14. This adjustment feature allows the operator of the apparatus to select the desired depth to which scraping edge 27 is set for various different cutting operations. Similarly, by loosening screw 16a, the blade 25 can be entirely removed to facilitate sharpening of the scraping edge 27.

Turning now to a description of the burner apparatus utilized to provide heat for facilitating the cutting or scraping operation, a removeable gas flow tube 29 extends longitudinally within the handle 18. Gas flow tube 29 can, of course, be molded within plastic handle 18 or simply attached to an exterior surface thereof. A conventional needle valve 30 is attached to the end of tube 29 at the heel or bottom end of handle 18. Needle valve 30 includes a spring biased adjustment knob 31 for continuously regulating the flow of gas therethrough. A rubber hose 35 is connected to a connector portion 36 of vlave 30 and a hose clamp 38 is positioned about the hose and connector so as to seal the hose and connector. The opposite end of hose 35 is connected to a tank 39 for containing a combustible gas (i.e., butane, propane, etc.,) as shown in FIG. 1. For the described application, propane is a particularly preferred combustible gas.

To regulate the flame provided by the burner apparatus, combustion control means, generally designated 40, are provided in communication with the gas flow tube 29. In particular, valving means in the form of a valving assembly 42, shown enlarged in FIG. 6, is provided for selectively increasing the gas-to-air flow to momentarily increase the length of the flame. The valving assembly 42 includes a valving chamber or cavity 44 within handle 18 in communication with gas flow tube 29. A plunger 45 having a first passageway 45a and a larger second passageway 45b extending therethrough is positioned within valving chamber 44. A biasing spring 46 urges plunger 45 upwardly. A push buttom 47 is provided for allowing plunger 45 to be pressed downwardly against the bias of spring 46. As shown, plunger 45 is normally positioned so that passageway 45a is aligned with gas flow tube 29. Upon depression of plunger 45, the enlarged passageway 45b is aligned with tube 29. This allows an increased amount of the combustible gas to pass through the valving assembly 42 momentarily increasing the length of the flame provided by the apparatus.

A conventional gas filter cartridge 54 is positioned downstream of the valving assembly 42 for removing contaminants (e.g., dirt particles, moisture, etc.,) from the propane gas. Downstream of cartridges 54, flow tube 29 narrows down to a restricted portion 29a defining a gas outlet 55 therein. An orifice cup 57 defining a gas bleed orifice 59 is positioned externally about the outlet 55 in tube portion 29a. The size of the orifice 59 determines the amount of gas exhausted through outlet 55 in gas flow tube 29. In the embodiment shown, orifice 59 is about 0.006 inches in diameter for providing the proper air to gas mixture.

A flame producing or blow torch assembly 65 defines a passageway 66 therethrough communicating with gas flow tube 29. As shown, the orifice cup 57 is held (e.g., clamped) in position by an inner end of the blow torch assembly 65 which extends axially within handle 18 so as to threadedly engage the restricted passageway 29a. The opposite or outer end of the assembly 65 defines an enlarged gas expansion cavity 68 having a circular transverse cross-section. A circular diffuser disk 70 is positioned within cavity 68 and held against an annular shoulder 71 by a retainer ring 72. Diffuser disk 70 includes a centrally positioned opening 70a and a plurality of smaller, equally spaced openings 70b positioned circularly about opening 70a. In the embodiment shown, opening 70a has a diameter of about 0.060 inches and the opening 70b has a diameter of about 0.031 inches. The diffuser disk 70 distributes and mixes the propane gas and air passing through passageway 66 resulting in the desired mixing thereof for combustion ignition purposes. As can be seen from the drawings, the portion of blow torch assembly 65 defining cavity 68 projects axially outward from handle 18.

Handle member 18 further defines a mixing chamber or cavity 75 upstream from diffuser cavity 68. Mixing chamber 75 communicates with passageway 66 in blow torch assembly 65 by four radially directed, cross drilled passageways 76 extending between passageway 66 and chamber 75. In the preferred embodiment shown, passageways 76 have a diameter of about 0.060 inches. This opening size has been found to provide essentially complete combustion. An air vent in the form of an air inlet opening 78 and a rotatable air damper closure member 79 for adjusting the size of air inlet opening 78 provides continuous control of the amount of air allowed to enter mixing chamber 75. This allows continuous regulation of the gas-to-air ratio of the combustible mixture passing through passageway 66 and, consequently, provides continuous regulation of the flame temperature.

Combustion manifold means in the form of a T-manifold assembly 80 has its trunk or longitudinally extending conduit portion 80a removeably attached to the outer end of blow torch assembly 65. T-manifold 80 is held fixedly in position by a pair of cone-shaped set screws 82a and 82b extending through the frame members 13 and 14 and engaging the dimpled ends of the transversely extending portion 80b of T-manifold 80. This means of mounting T-manifold 80 significantly reduces heat transmission from the manifold to the frame member 13 and 14 and to the attached handle 18. As shown, the transversely extending portion 80b is slightly shorter in length than the scraper edge 27 of scraper 25. A plurality of equally spaced flame outlet openings 85 are positioned linearly along the transversely extending portion 80b of manifold 80. Finally, a dual combustion bar member 87 is mounted in a parallel, spatially separated relationship with the transverse manifold portion 80b directly over the center line of the linearly extending flame outlet openings 85. As described subsequently in greater detail, the bar member 87 causes the flame 88 emitted from each of the openings 85 to separate and curl about the bar member. This separation of the flame into two component parts (i.e., dual combustion) retains the combustion adjacent the manifold portion 80b. While other size flame outlet openings and combustion bars can be utilized, a flame outlet having a diameter of about 0.055 inches and a combustion bar having a diameter of approximately 0.050 inches spaced about 0.002 to 0.004 inches from the flame outlet has been found to be highly desirable. As shown, the T-manifold 80 and scraper 25 are positioned so that the flame emitted from the flame exhaust ports 85 is projected outwardly adjacent the scraper edge 27 and in a direction generally parallel thereto.

To protect the user of my invention from undue exposure to the heat provided by the combustion occurring along the manifold portion 80b, a heat shield or curtain 90 is provided. As shown, heat shield 90 includes an inner end portion 90a attached to the handle 18 by an attachment strap 91. Heat shield 90 then extends along the underside of handle 18 until reaching the toe end thereof whereupon it extends upwardly intermediate the cross-bar portion 80b of T-manifold 80 and the handle 18. Finally, heat shield 90 curves so as to extend along the upper edges of members 13 and 14 to a position adjacent scraper blade 25. An opening 92 in heat shield 90 allows the manifold trunk portion 80a to extend therethrough.

The gas heated, paint scraper shown in FIGS. 1–8 can be readily modified to provide the apparatus shown in FIGS. 9 and 10. To obtain the illustrated apparatus, set screws 82a and 82b are loosened to allow the removal of T-manifold 80. Additionally, the scraper blade 25 is removed and a rotary blade 98 is installed in its place. So modified, combustion now occurs in the form of an elongated or pencil-type flame 99 directed outwardly from the flame outlet openings 70a and 70b in diffuser disk 70. This flame extends axially outward toward the circular cutting edge 98a of the rotary blade 98 and is preferably incident thereupon in a generally coplaner manner. This heats the blade to a quite high temperature (e.g., approximately 1,200°F.) greatly improving the efficiency of the circular blade in such operations as cutting tile, rubber, felt, etc.

When the present burning apparatus is utilized either to facilitate paint scraping (as shown in FIGS. 1–8) or to heat a rotary blade for use in cutting tile, etc., (as shown in FIGS. 9 and 10) the combustion control apparatus provided by my invention allows the flame temperature to be readily controlled. Specifically, adjustment of the size of the air inlet opening 78 allows continuous regulation of the gas-to-air mixture and, consequently, control of the flame temperature over a relatively wide range (e.g., from about 900°F to 2,500°F.). Further, by depressing the plunger 44 of bleed-valve assembly 42, the length of the flame (i.e., the distance the flame extends outward from T-manifold 80 or from diffuser disk 70 when T-manifold 80 is removed) is momentarily increased by increasing the gas flow within gas flow tube 29. When released, the length of the flame returns to its previous operating length, thus providing readily obtainable high or low flames. The length of the flame can be further controlled by adjustment of needle valve 30 to a desired setting. As mentioned previously, the temperature of the flame is determined by the setting of air damper 79.

It should be understood that when the present apparatus is utilized with T-manifold assembly 80, the burner apparatus provides a relatively flat flame which is parallel to the cutting edge 26 of blade 25. That is, the flame provided by the burner apparatus is of substantially greater width than length. For instance, in the embodiment shown, the flame outlets 85 in manifold portion 80b are spaced in sufficiently close proximity so that a substantially continuous flame is produced along the dual combustion bar 87. This flame has a width generally equal to (of slightly shorter than) the length of cutting edge 27 (e.g., approximately 2 inches) whereas, its length is only approximately ½ inch. Heretofore, flames of such configuration have not been obtainable.

In view of the fact that the description of my invention has been in terms of a preferred embodiment, numerous modifications will be readily apparent to those skilled in the art. For example, it is readily apparent that differently sized and designed blades can be utilized. Also, various, alternative means are well known for controlling the temperature of the flame provided by my invention. Thus, it is my intent to be limited solely by the spirit and scope of the claims which follow.

What is claimed is:

1. Apparatus for producing a broad flame front from a supply of combustible gas comprising:
   a. a T-manifold assembly having a longitudinal portion and a transverse portion;
   b. said transverse manifold portion containing a plurality of flame outlet openings positioned therealong in a generally linear, spatially separated relationship;
   c. conduit means connected to said longitudinal manifold portion and connectable to a source of combustible gas; and
   d. said manifold assembly including further means adjacent said outlet openings to modify the flow of combustible gas issuing from said outlet openings to establish and retain combustion closely adjacent said transverse portion.

2. The apparatus of claim 1 wherein said last-named means is a bar member mounted outside said manifold assembly in a generally parallel, spatially separated relationship with said transverse manifold portion adjacent said flame outlet openings to cause the flame emitted from said openings to divide and curl about said bar member.

* * * * *